United States Patent [19]
Zimmer et al.

[11] 3,807,819
[45] Apr. 30, 1974

[54] BEARING ASSEMBLY

[75] Inventors: George A. Zimmer, Ithaca, N.Y.; Hilarius S. Struttmann, St. Charles, Ill.

[73] Assignee: Borg-Warner Corporation, Chicago, Ill.

[22] Filed: Aug. 4, 1972

[21] Appl. No.: 278,139

[52] U.S. Cl. .............................................. 308/207
[51] Int. Cl. ............................................ F16c 13/00
[58] Field of Search .............. 308/194, 184, 72, 207

[56] References Cited
UNITED STATES PATENTS
2,048,972  7/1936  Scheffler ........................... 308/194
2,397,164  3/1946  Shafer ................................. 308/72

FOREIGN PATENTS OR APPLICATIONS
11,130    1908     Great Britain ..................... 308/194
451,754   10/1965  Canada .............................. 308/194
894,743   9/1958   Great Britain ..................... 308/11

Primary Examiner—Charles J. Myhre
Assistant Examiner—Frank Susko
Attorney, Agent, or Firm—Donald W. Banner

[57] ABSTRACT

A self-aligning bearing assembly in which the bearing is axially movable with respect to the housing while maintaining a fixed relation with respect to the shaft.

4 Claims, 6 Drawing Figures

3,807,819

BEARING ASSEMBLY

BACKGROUND OF THE INVENTION

Bearing assemblies, each as the combination of a housing and a bearing, are generally axially fixed with respect to the shaft being supported and the surface to which the housing is fixed. While such bearings may be self-aligning, permitting slight shaft misalignment, they are not constructed to permit bearing and the shaft axial movement which may be desirable in some applications, as, for example, when the assembly is subjected to elevated temperatures or very low temperatures, while maintaining a fixed relationship between the bearing and the shaft.

THE INVENTION

According to this invention, there is provided a bearing assembly which comprises a housing and a bearing in the housing assembled in such a manner that the bearing is fully self-aligning and is capable of axial movement with respect to the housing. The bearing is fixed to a shaft being supported thereby in a fixed relationship regardless of the axial position of the bearing with respect to the housing.

Axial movement of the bearing with respect to the housing is permitted by using insert ring means between the bearing and the housing. These insert rings engage the outer spherical surface of the bearing, permitting the bearing to be fully self-aligning and are slidable with respect to the inner cylindrical surface of the housing. They are, in effect, adaptor rings. In some embodiments, one or more of the rings slidably engage the housing surface. In another embodiment, a cylindrical inner housing is between the rings and the housing, the inner housing being in slidable contact with the inner cylindrical surface of the housing.

Means are provided for retaining the bearing in the housing, so that the bearing remains in the housing under extreme conditions. Such means may be various combinations of depending housing flanges, snap rings fitting in grooves in the housing and a spring washer between an insert ring means and the snap ring.

The bearing may be of the roller or ball variety while the housing may be a pillow block or a flange block without departing from the spirit of the invention.

THE DRAWINGS

FIG. 1 is an illustration of a typical pillow block incorporating a bearing such as depicted in FIGS. 2 to 6 inclusive and FIGS. 2 to 6 inclusive are sectional views through bearing assemblies constructed according to this invention.

DETAILED DESCRIPTION

Figure 1:
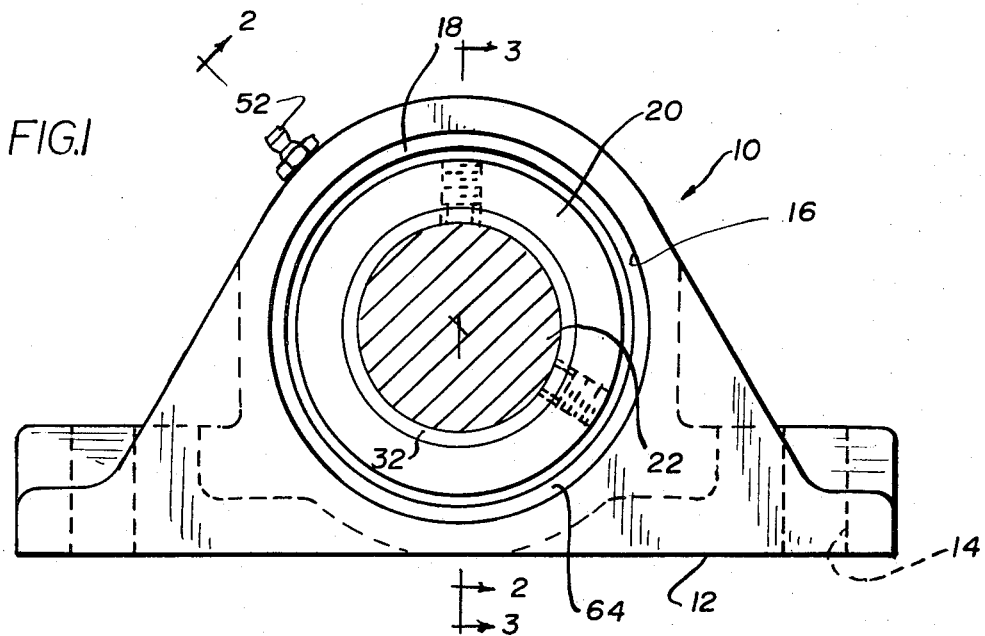

Looking at the drawing, FIG. 1 illustrates a typical pillow block housing 10 which is a casting having a relatively flat base 12 with elongated openings through which bolts (not shown) pass to connect the block to a suitable support. The housing 10 is provided with a cylindrical opening 16 to receive a bearing assembly 18 which is connected by a shaft locking means 20 to a shaft 22 being supported thereby.

FIG. 2 to 6, inclusive, illustrate various embodiments of the bearing assemblies according to this invention. In each embodiment, the bearing 18 is identical and comprises a cylindrical inner race 26 having spaced inner raceways 28, 30. The inner race receives the shaft 22 and the locking means 20 engages race extensions 32 to lock the shafts to the race. In some constructions only one locking means 20 is required. The bearing has an outer race 34 with spaced outer raceways 36, 38 and an outer spherical surface 40. In the embodiments illustrated, sets of rollers 42 are positioned between the races and engage the raceways. A retainer or cage 44 is provided for each set of rollers 42 and maintains the rollers spaced without interferring with relative rotation between the races.

The outer race 34 is illustrated as being made of two halves, joined vertically, and is provided with extensions 46. Grease seals 48 are positioned between the inner race and the extensions 46. Grease is introduced into the bearing through an opening 50 which communicates with a grease fitting 52 on the housing 10. The structure just described is identical for each of the modifications illustrated.

Figure 2:
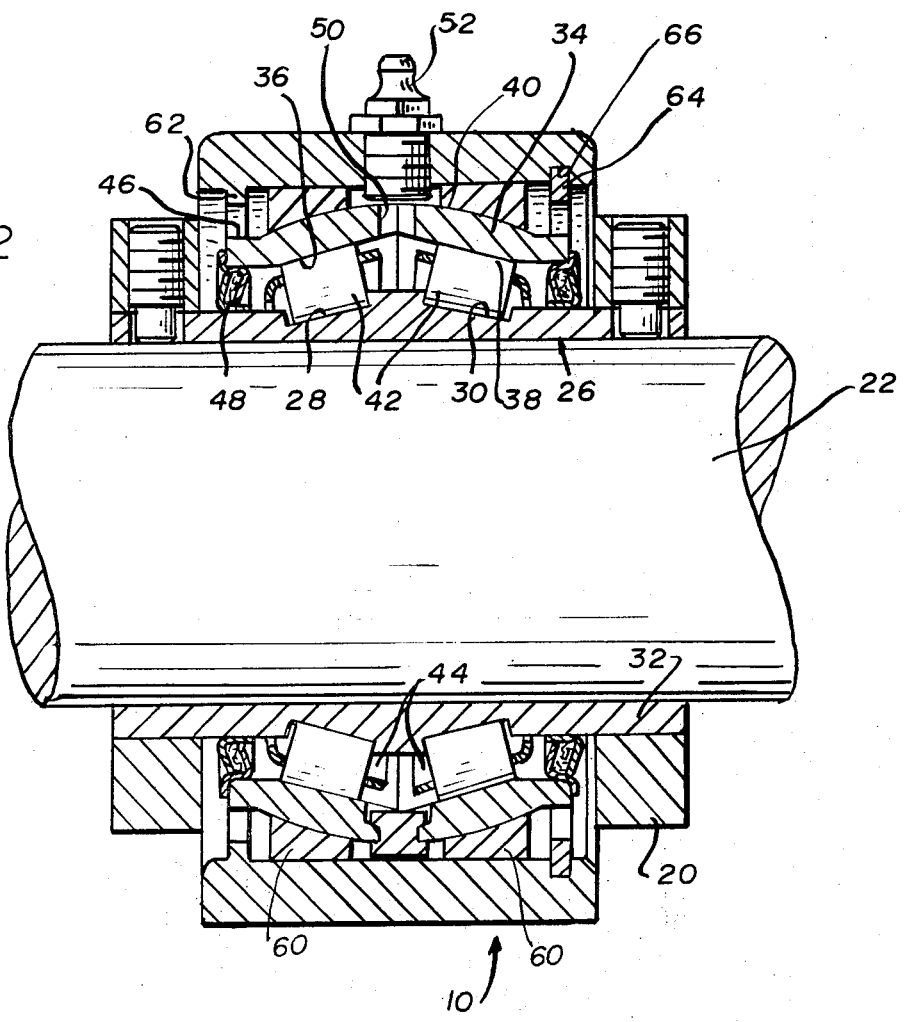

FIG. 2 illustrates an assembly in which a pair of ring insert means 60 are positioned between to engage the surface of the housing opening 16 and the surface 40 of the outer race 34, so as to limited lateral movement of the bearing 18 relative to the housing 10 while maintaining a fixed relationship between the bearing 18 and the shaft 22. The bearing is retained in the housing by a depending housing flange 62 at one end of the housing 10 and a snap ring 64 fitting in a groove 66 at the other end of the housing 10.

Figure 5:
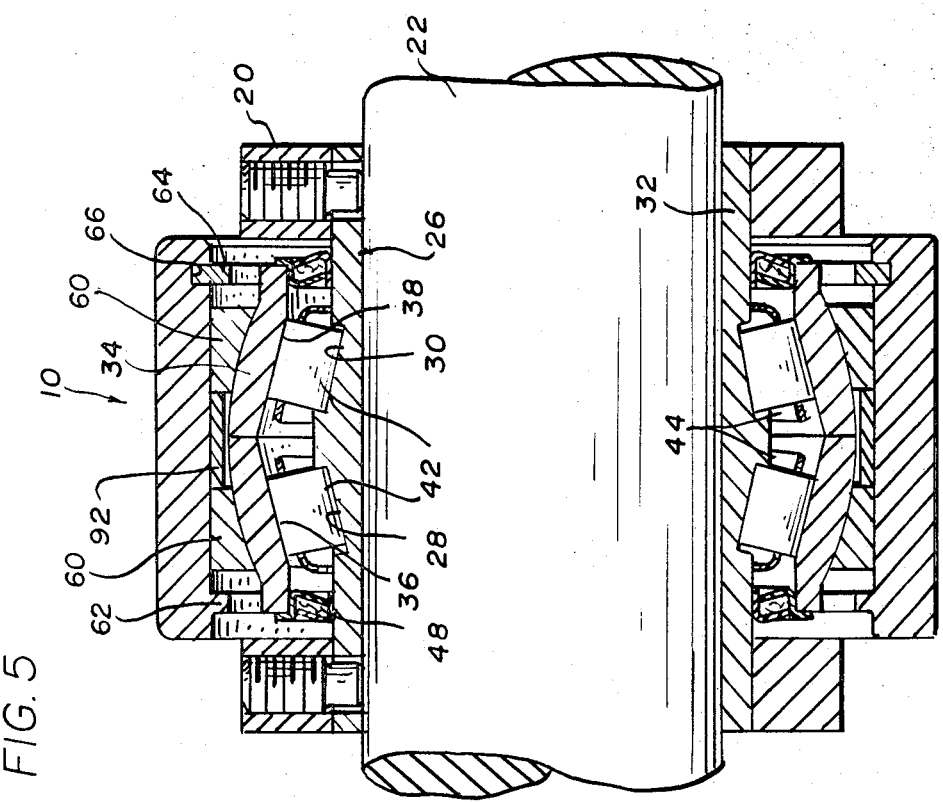

In addition, there is a spacer member which centrally joins the ring inserts 60, being illustrated in FIG. 5; FIG. 5 being taken on a different section line through the bearing.

Figure 3:
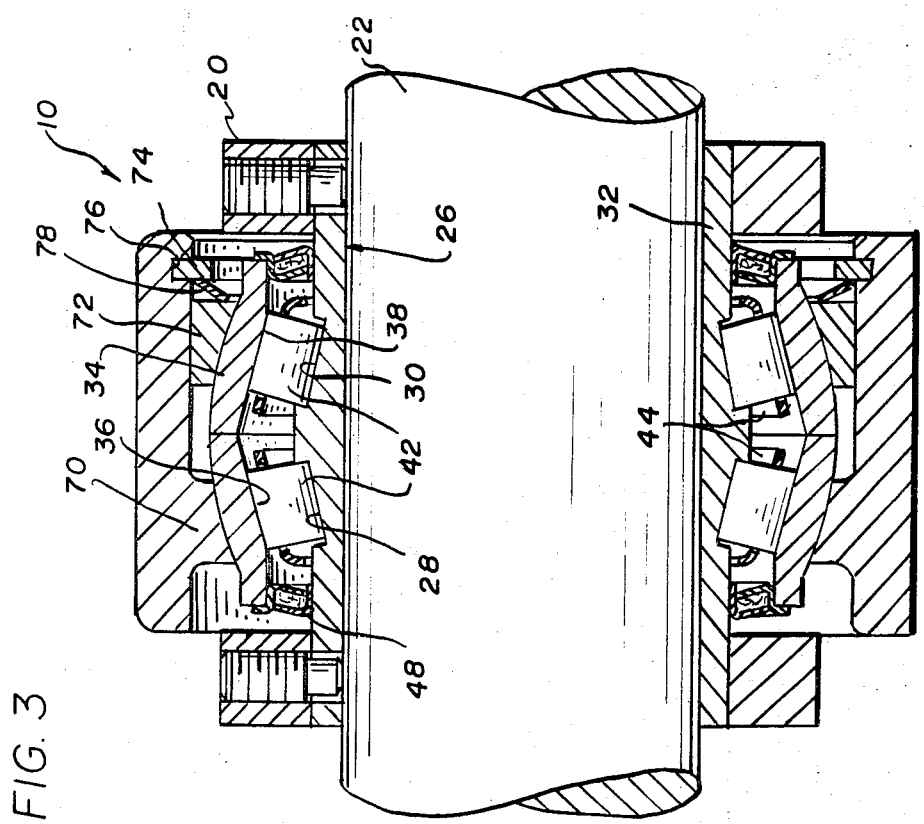

FIG. 3 illustrates another embodiment in which the housing 10 has a portion 70 at one end thereof engaging the outer race 34 and a ring insert 72 adjacent the other end thereof. A snap ring 74 in a groove 76 is provided adjacent the ring insert 72, and a spring washer 78 resiliently urges the ring insert into continued engagement with the outer race 34. This construction permits lateral movement in one direction.

Figure 4:
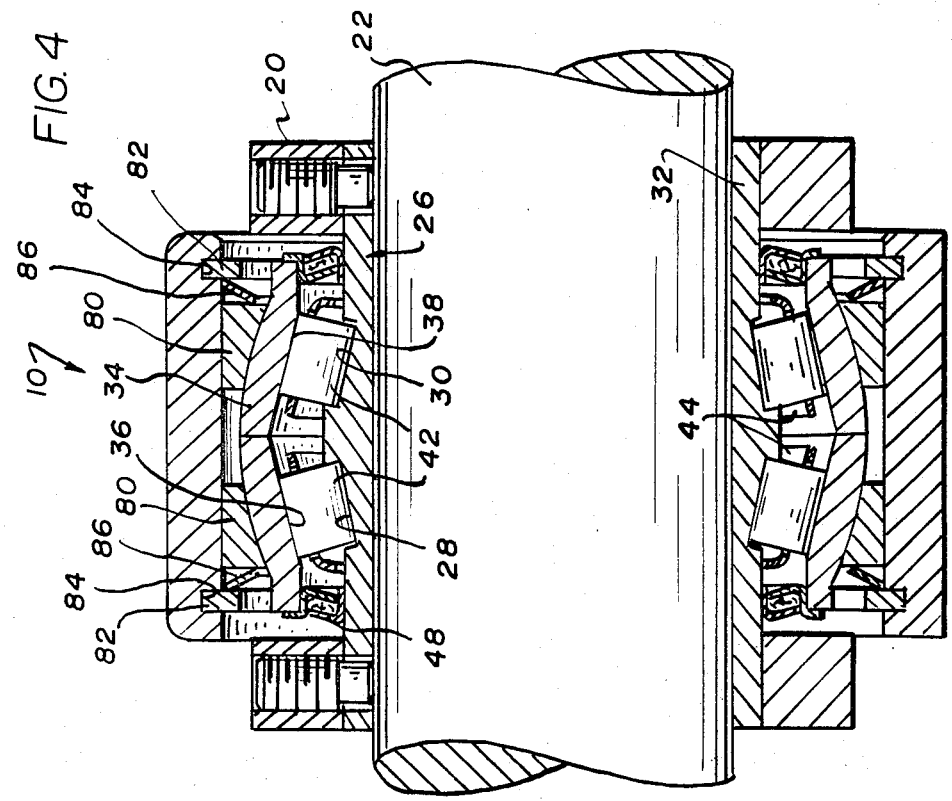

FIG. 4 illustrates another modification of the invention in which the retaining means comprises a pair of ring inserts 80 each resiliently urged toward the outer race 34 by snap rings 82 in housing grooves 84 and spring washers 86 between the snap rings and the inserts.

FIG. 5 is a sectional view of the FIG. 2 embodiment except that it is taken on a different section line, and FIG. 5 illustrates the spacer means 92 connecting the ring insert members 60.

Figure 6:
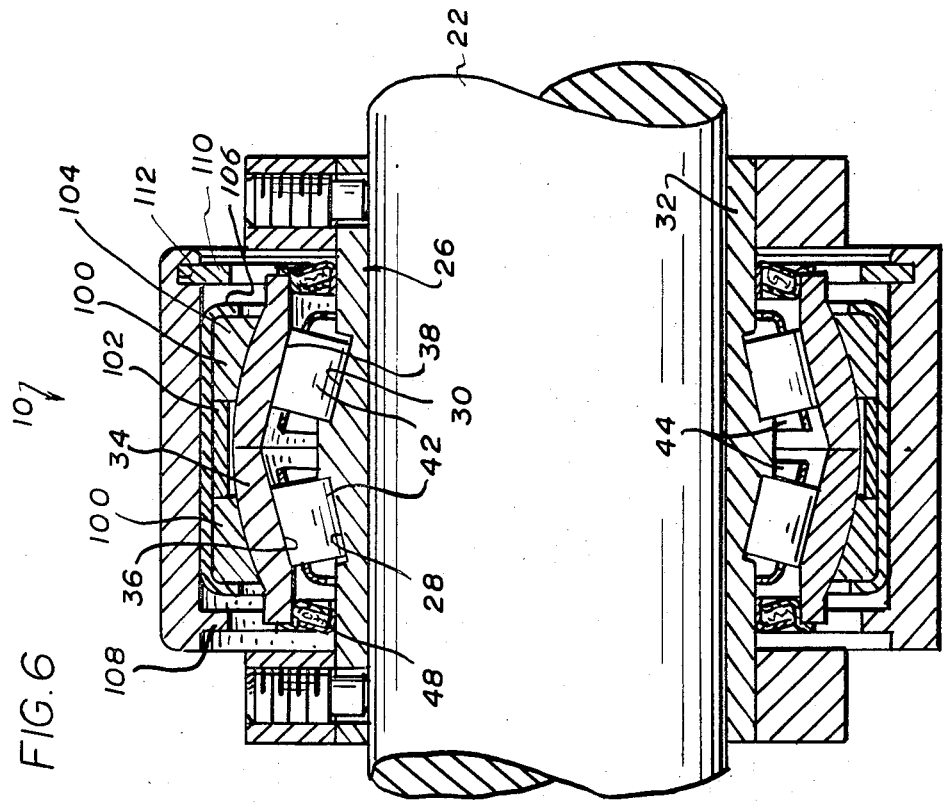

FIG. 6 is still another embodiment and has ring inserts 100 joined centrally by a spacer 102 and encased in a substantially cylindrical member 104 having turned flanges 106 retaining the bearing and ring inserts as a unit. The retaining means comprises the depending housing flange 108 and snap ring 110 received in housing groove 112 acting against the insert.

While the embodiments have been described with reference to a pillow block housing and roller bearings, it should be apparent that a flange housing and/or ball bearings can be used without departing from the spirit of the invention.

We claim:

1. A self-aligning bearing comprising:

a housing having a generally cylindrically surfaced opening therethrough, said housing being adapted to be fixed to a support;

a bearing assembly received in said opening, said bearing assembly comprising:

an inner race having a central cylindrical opening for receiving a shaft and outer spaced frusto-conical raceways;

an outer race having an outer spherical surface and inner spaced frusto-conical raceways; and sets of rollers, each set being between opposed inner and outer raceways and in rolling contact therewith;

ring insert means comprising a pair of annular ring members each having a continuous annular inner spherical surface and a continuous outer cylindrical surface, said ring members being located between the outer spherical surface of said outer race and said cylindrical surface of said housing with one ring member being opposite one set of rollers and the other ring member being opposite the other set of rollers, said annular ring members permitting pivotable movement of said bearing assembly with respect to said housing in response to shaft misalignment relative to said support, means for connecting said annular ring members, and means for retaining them in said housing permitting lateral movement of said bearing assembly relative to said housing.

2. A bearing assembly as recited in claim 1 wherein said retaining means comprises a groove in said housing, and a snap ring in said groove.

3. A bearing assembly as recited in claim 2 wherein said retaining means further comprises a depending flange adjacent one end of said housing, said groove and snap ring being adjacent the other end thereof.

4. A bearing assembly as recited in claim 1 further including a substantially cylindrical member enclosing said ring insert means and positioned between the insert means and the housing.

* * * * *